(12) United States Patent
van den Berg

(10) Patent No.: US 11,078,659 B2
(45) Date of Patent: Aug. 3, 2021

(54) SEWAGE PIT

(71) Applicant: Pharmafilter B.V., Amsterdam (NL)

(72) Inventor: Eduardo Alexander van den Berg, Amsterdam (NL)

(73) Assignee: Pharmafilter B.V., Amsterdam (NL)

(*) Notice: Subject to any disclaimer, the term of this patent is extended or adjusted under 35 U.S.C. 154(b) by 401 days.

(21) Appl. No.: 15/745,599

(22) PCT Filed: Jul. 21, 2016

(86) PCT No.: PCT/NL2016/050547
§ 371 (c)(1),
(2) Date: Jan. 17, 2018

(87) PCT Pub. No.: WO2017/014636
PCT Pub. Date: Jan. 26, 2017

(65) Prior Publication Data
US 2018/0202141 A1 Jul. 19, 2018

(30) Foreign Application Priority Data

Jul. 21, 2015 (NL) .................................... 2015201
Apr. 11, 2016 (NL) .................................... 2016583

(51) Int. Cl.
*E03F 5/22* (2006.01)
*B09B 1/00* (2006.01)
(Continued)

(52) U.S. Cl.
CPC ................ *E03F 5/22* (2013.01); *B09B 1/006* (2013.01); *C02F 1/001* (2013.01); *C02F 1/02* (2013.01);
(Continued)

(58) Field of Classification Search
CPC .. B09B 1/006; C02F 2307/08; C02F 2303/26; C02F 1/001; E03F 5/26; E03F 5/101; E03F 5/22

See application file for complete search history.

(56) References Cited

U.S. PATENT DOCUMENTS 3,897,600 A 8/1975 Burkholder
4,092,249 A * 5/1978 La Gatta ............... B01F 3/0473
210/195.1

(Continued)

FOREIGN PATENT DOCUMENTS

CN 205796642 U * 12/2016
DE 8903057 U1 4/1989
(Continued)

OTHER PUBLICATIONS

Rukhabot, conduit—Wiktionary, Jan. 12, 2015, XP055594095, retrieved from the Internet: URL:https://en.wiktionary.org/w/index.php?title=conduit&oldid=32026643 [retrieved on Jun. 4, 2019].
(Continued)

*Primary Examiner* — Angelisa L. Hicks
(74) *Attorney, Agent, or Firm* — Bret E. Field; Bozicevic, Field & Francis LLP

(57) ABSTRACT

The invention relates to a sewage pit (1, 60) for receiving and discharging waste material, particularly domestic, medical and/or industrial waste comprising liquid and solid constituents, to the sewer (52), the sewage pit comprising: —a housing (2, 3, 4) with a closable receiving space (9), wherein one or more of the walls of the housing is provided with at least one inlet (19) configured to carry the waste material into the receiving space, a flushing liquid feed (10) which is embodied to feed flushing liquid to the receiving space for bringing the waste material into suspension, and at least one outlet (29) which can be connected to the sewer and is configured to discharge the mixture of waste material (Continued)

and flushing liquid from the receiving space and to the sewer, —at least one pump (25, 26) connectable or connected to the one or more outlets which is configured to pump the mixture which has been brought into suspension from the receiving space and to discharge the mixture via the one or more outlets.

12 Claims, 9 Drawing Sheets

(51) Int. Cl.
| | | |
|---|---|---|
| *C02F 1/00* | (2006.01) |
| *C02F 1/02* | (2006.01) |
| *E03F 5/10* | (2006.01) |
| *E03F 5/26* | (2006.01) |
| *C02F 103/00* | (2006.01) |

(52) U.S. Cl.
CPC ............... *E03F 5/101* (2013.01); *E03F 5/26* (2013.01); *C02F 2103/003* (2013.01); *C02F 2303/04* (2013.01); *C02F 2303/24* (2013.01); *C02F 2303/26* (2013.01); *C02F 2307/08* (2013.01)

(56) References Cited

U.S. PATENT DOCUMENTS

| | | | | |
|---|---|---|---|---|
| 4,800,907 A | * | 1/1989 | Giehl | E03F 5/101 |
| | | | | 134/166 R |
| 2001/0011643 A1 | * | 8/2001 | Newton | C02F 3/34 |
| | | | | 210/601 |
| 2005/0161398 A1 | * | 7/2005 | Couch | C02F 3/121 |
| | | | | 210/620 |
| 2012/0292402 A1 | * | 11/2012 | Otto | B01F 5/106 |
| | | | | 239/104 |
| 2018/0155904 A1 | * | 6/2018 | Mun | B01D 35/02 |

FOREIGN PATENT DOCUMENTS

| | | | |
|---|---|---|---|
| EP | 2188069 A1 | 5/2010 | |
| JP | H07207744 A | 8/1995 | |
| JP | H09964 A | 1/1997 | |
| JP | 2002-126719 A | 5/2002 | |
| JP | 2007-077697 A | 3/2007 | |
| WO | WO9800610 A1 | 1/1998 | |
| WO | WO02097204 A1 | 12/2002 | |
| WO | WO-2006069772 A1 * | 7/2006 | ............... E03F 5/22 |

OTHER PUBLICATIONS

Office Action for European Application No. 16762898.1 dated Jun. 18, 2019, 5 pages.
Office Action for Japanese Application No. 2018-523731 dated Jun. 9, 2020, with its English translation, 24 pages.

* cited by examiner

SEWAGE PIT

The present invention relates to a sewage pit and a method for receiving and discharging waste material, particularly domestic, medical and/or industrial waste comprising liquid and solid constituents, to the sewer system.

Systems are known for treating hospital waste, wherein the waste is received at diverse locations in the hospital and is carried to a central storage and treatment location by hand. An improved system is described in the European patent publication EP 2 188 069 A1. In this latter system use is made of a number of shredding devices suitable for shredding the hospital waste, for instance consisting of faeces and urine in a container such as a chamber pot, and making the waste ready for further treatment. The shredded hospital waste is carried via conduits to a separating device in which the actual hospital waste is separated from the material of the shredded container. The known system further comprises one or more cleaning devices and/or purification devices whereby the waste can be further cleaned and/or purified. The cleaned and purified waste is then guided to the public sewer system (also referred to herein as the sewer) and discharged via this system.

When the conduit system of the known system is connected directly to sewer pipes of the sewer and the shredded waste material has to be discharged directly via these sewer pipes, there is a risk, depending among other things on the shredding quality of the shredding devices and/or the composition of the waste material, of the sewer becoming blocked. It would optionally be possible to connect the conduit system to a sewage pit arranged in the ground of the area surrounding the hospital. Such a sewage pit (also referred to as cesspit or inspection well) serves to enable inspections to be carried out in the sewer system, and further provides the option of removing possible blockages. It is for instance possible to periodically clean the inspection well, although it will be apparent that this entails extra costs and inconvenience.

In the context of the above stated problems, it is an object of the invention to provide a sewage pit and/or a method for discharging waste material whereby waste material consisting of solid and liquid constituents can be discharged to the sewer in reliable manner. It is also an object of the invention to provide a sewage pit and method wherein the chance of blockages has been reduced. It is also an object of the invention to provide a waste treatment system suitable for treating and carrying such waste material generated in a building to the sewer in rapid, reliable and/or efficient manner.

According to a first aspect of the invention, at least one of the stated objectives and/or another objective is achieved in a sewage pit for receiving and discharging waste material, particularly domestic, medical and/or industrial waste comprising liquid and solid constituents, to the sewer, the sewage pit comprising:
a housing with a closable receiving space, wherein one or more of the walls of the housing is provided with at least one inlet configured to carry the waste material into the receiving space, a flushing liquid feed which is embodied to feed flushing liquid to the receiving space for bringing the waste material into suspension, and at least one outlet which can be connected to the sewer and is configured to discharge the mixture of waste material and flushing liquid from the receiving space and to the sewer,
at least one pump connectable or connected to the one or more outlets which is configured to pump the mixture which has been brought into suspension from the receiving space and to discharge the mixture via the one or more outlets.

The walls in which the at least one inlet, the flushing liquid feed and the at least one outlet are arranged can in determined embodiments be one or more of the side walls, but in other embodiments it is also possible to arrange at least one of the inlet, flushing liquid feed and outlet in the upper wall, for instance the pit cover.

Due to the feed of flushing liquid the waste material, more particularly the solid constituents thereof, can be (better) brought into suspension. The waste material can hereby be better discharged and/or the chance of blockages is hereby relatively small.

The sewage pit can be block-shaped, wherein the pit comprises four upright side walls and a lying concrete lower wall or floor. Other embodiments are of course also possible, for instance embodiments with a substantially cylindrical form. The upper side can be closed with an upper wall provided with an access hatch which can be opened. The sewage pit is further embodied to be arranged wholly or partially in the ground and to be anchored therein. Sewage pits can be made of different materials, such as of prefabricated concrete or plastic (PE, PVC or GRP).

The outlet of the sewage pit is preferably configured (in respect of height in the pit and thereby in the ground, the diameter of the discharge conduit and so on) such that it can be connected directly, and preferably without further technical measures, to the sewer pipes present in the ground.

The sewage pit preferably comprises a receiving surface formed on the lower side of the receiving space and configured to set the supplied waste material at least partially into a swirling motion with the flushing liquid. The supplied waste material can be received on the receiving surface, for instance in that solid constituents thereof settle on the surface. By guiding spraying liquid along the receiving surface the received waste material can be set into motion so that the solid constituents once again tend to become suspended in the liquid constituents and/or the spraying liquid.

In determined embodiments the receiving surface is formed by the base of the sewage pit. In other embodiments the receiving surface is formed by a receiving plate, for instance a steel plate. The receiving surface is in a determined embodiment more specifically formed by a receiving plate, particularly a steel receiving plate, which can be mounted or is mounted substantially obliquely in the receiving space, wherein the flushing liquid feed is configured to allow flushing liquid to flow along the upper side of the receiving plate. The solid constituents are in this way urged to one determined side and can there be set into swirling motion.

In a determined embodiment the angle of inclination (a) between the receiving surface and an upright wall is between 30 and 80 degrees, preferably between 40 and 60 degrees.

The flushing liquid feed can comprise one or more feed conduits provided with a spray nozzle, wherein the spray nozzles are arranged such that flushing liquid can be sprayed onto and/or along the receiving surface. The feed conduits can optionally be connected directly or indirectly to the standard domestic mains water supply. The pressure of the supplied flushing liquid is optionally increased further, for instance by one or more pumps, although this is not necessary in all cases.

In a further embodiment said receiving surface comprises a first even receiving part-surface disposed substantially obliquely and at a higher position and a second substantially concave receiving part-surface disposed at a lower position.

The concave (hollow) form is preferably embodied here such that the mixture of spraying liquid and waste material flowing therealong is set into a swirling motion. The flushing liquid feed is configured here to guide flushing liquid onto and/or along the first part-surface in the direction of the second part-surface.

Once the mixture has been brought (further) into suspension it can be drawn off and discharged to the sewer. The mixture which has been brought into suspension is preferably pumped away from a position close to the receiving surface, for instance a position less than 2 m relative to the concave receiving part-surface, or even less than 1 m therefrom. In the area that close to the concave part there is a relatively great chance of the mixture being in suspension, and the chance of an adequate discharge of the waste material is relatively great.

According to another aspect of the invention, the sewage pit forms part of a waste treatment system. An example of such a system is described in the European patent publication EP 2 188 069 A1, the content of which must be deemed as incorporated herein as a whole. In a determined embodiment a waste treatment system is provided for shredding and transporting waste material, particularly domestic, medical and/or industrial waste comprising liquid and solid constituents, in a building, particularly a care institution or airport, wherein the waste treatment system comprises:

- one or more shredding devices disposed at different locations in the building for shredding supplied waste material;
- a conduit system which is connected on one side to one or more discharges of said one or more shredding devices and on the other to at least one sewage pit connected or connectable to the sewer, and which is configured to transport the shredded waste material to the at least one sewage pit;
- one or more separating devices arranged in the conduit system and configured to separate the waste material transported in the conduit system into at least a first and second waste part and to carry only the first waste part to the sewage pit; and/or
- one or more purification devices arranged in the conduit system and configured to purify at least one waste part of the waste material transported in the conduit system; and/or
- one or more fermenters arranged in the conduit system and configured to ferment at least one waste part of the waste material transported in the conduit system.

By adding one or more sewage pits to the waste treatment system a more efficient and reliable treatment (i.e. processing and transport) of the waste material generated in the building can be realized, and the chance of blockages in the system and/or in the sewer connected to the system is relatively small.

According to yet another aspect of the invention, a method is provided for receiving waste material, particularly domestic, medical and/or industrial waste comprising liquid and solid constituents, in a sewage pit and discharging the material to the sewer, wherein the method comprises of:

- supplying waste material into the receiving space of a sewage pit;
- supplying flushing liquid into the receiving space and mixing the flushing liquid with the supplied waste material for the purpose of bringing the solid constituents thereof into suspension;
- discharging the suspension of flushing liquid and waste material from the receiving space.

In some embodiments the waste material is only set into motion and/or brought into suspension. In other embodiments the waste material is also set into swirling motion, which enhances the process of the solid constituents of the waste material entering into suspension. Bringing the waste material into swirling motion can be brought about in various ways. In an advantageous embodiment the method comprises for this purpose of carrying flushing water along an oblique receiving surface provided in the lower part of the receiving space. This can result in a downward displacement of waste material received on the receiving surface. The displaced waste material can then be set into swirling motion by first carrying flushing water along an oblique receiving part-surface and then carrying the flushing water along a substantially hollow receiving part-surface.

Further advantages, features and details of the present invention will be elucidated on the basis of the following description of several embodiments thereof. Reference is made in the description to the figures, wherein.

Examples of a waste treatment system to which the sewage pit described herein can be connected are described in the European patent publication EP2859952 A1, the content of which must be deemed as incorporated herein. An example of a waste treatment system according to an embodiment of the invention is described below with reference to this patent publication and to the accompanying FIG. 8. Waste treatment system 41 can for instance be applied in a building such as a care institution (for instance a hospital, nursing home or home for the elderly), an airport terminal, office building, stadium and the like, where waste flows are generated at many separate locations. These waste flows are to greater or lesser extent liquid here, so that they can be discharged via a conduit system, for instance to a sewage pit 60 of the type described herein and then to the public sewer system 52. Solid substances (such as particles of diverse dimensions, objects) can also be present in the waste flows in addition to the liquid substances. In the course of care in a care institution waste such as faeces and the like are for instance generated, and this waste can be discharged including the container (chamber pot) in which the waste is presented. The waste flow consists here of a solid substance (the container) and a liquid substance (the faeces). In the case of an airport the waste flow can also consist of solid substances (for instance food packagings and the like) and liquid substances (such as faeces, flushing water and the like).

Figure 8:
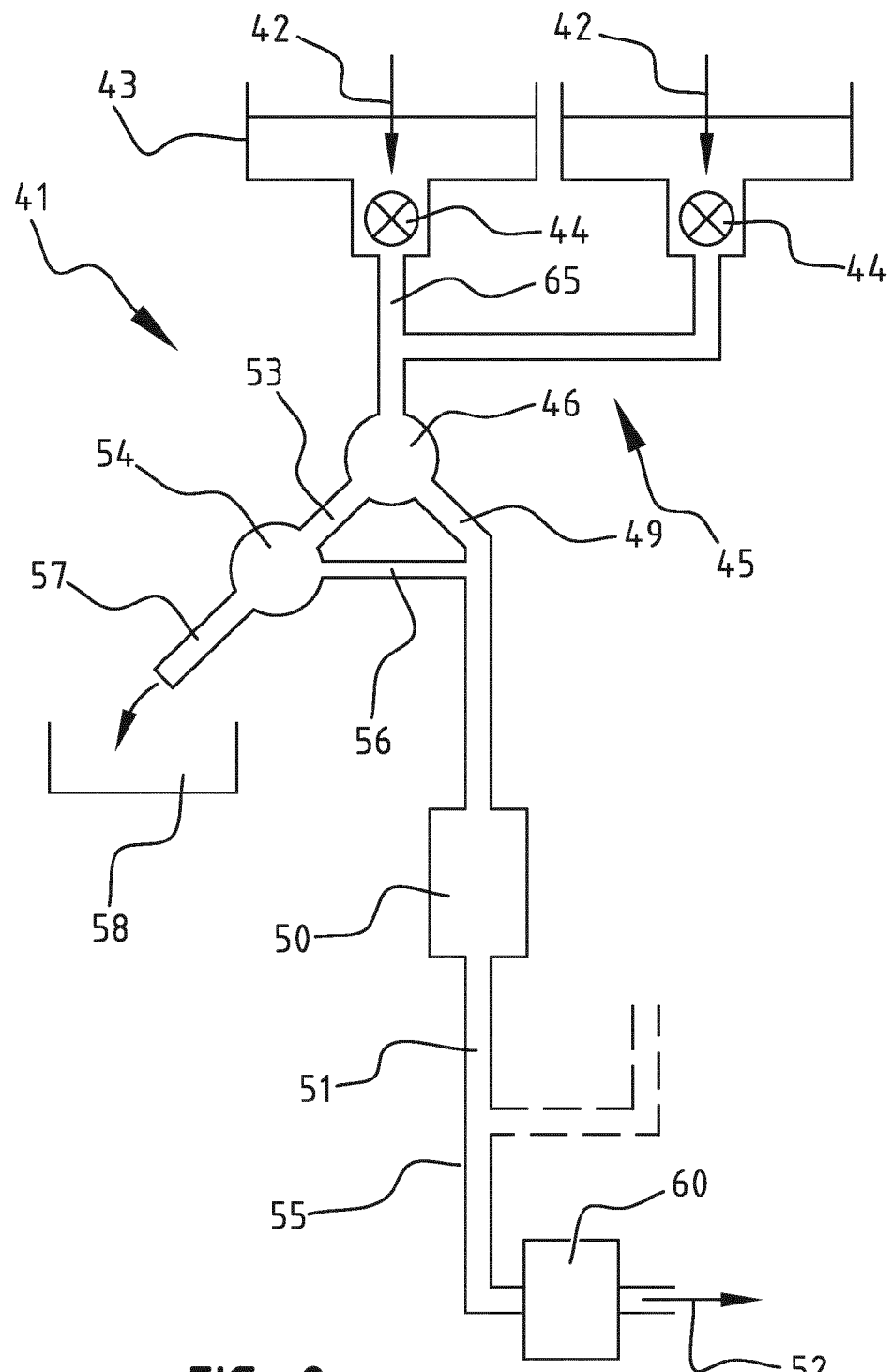
FIG. 8 is a schematic view of a first variant of a waste treatment system for use with waste material with non-biodegradable containers.

The embodiment shown in FIG. 8 comprises a number of inlet units 42 where the waste can be presented. The inlet units are situated at different locations in the building, for instance in all bathrooms of a care institution. Shown in the figure are two inlet units, although this number can of course also be smaller or (much) greater. An inlet unit 42 comprises in the shown embodiment a housing 43 in which a shredding device 44 is arranged. This shredding device 44 is provided in the inlet unit for the purpose of fine shredding of possible solid substances in the waste. As alternative or in addition to the inlet units with shredding devices, inlet units can also be realized in which such a shredding device is not arranged. In these embodiments the waste is shredded elsewhere (so outside the inlet unit) or a shredding process is not necessary, for instance in the case of a waste flow without solid substances.

A more specific example of such a shredding device which can form part of an embodiment of the waste treatment system 41 described herein is described in the European patent publication EP 3015750 A1, the content of which must be deemed as incorporated herein.

Each of the inlet units 42 is coupled to a shared conduit system 45 along which the waste is discharged and in which it can optionally be further treated. The term "conduit" is understood here to mean any form of tube, shaft, duct, pipe and so on suitable for enabling transport of the waste. Situated immediately downstream of inlets 43 is a shredding device 44. Following shredding the waste can be displaced in simple manner through a conduit system. Preferably present is a central separating device 46 into which different inlets debouch. In this separating device separation takes place between the actual waste (faeces and the like) and the solid substance, for instance the container material of the shredded containers. The actual waste is fed via a conduit 49 to a purification installation 50. The liquid part of the waste fed via conduit 49 (consisting largely of water) is purified in purification installation 50 and subsequently discharged via discharge conduit 51 to sewer system 52. This waste flow can be clean such that it can optionally be reused.

The waste flow with solid substance, for instance with shredded container material, separated in separating device 46 is guided via a conduit 53 to a cleaning device 54. Cleaning of the container material can take place using a cleaning fluid, for instance flushing water which may for instance be the flushing water made available at outlet 55. Cleaning device 46 is further embodied to perform a separation between the cleaned solid substance and the fluid (for instance flushing water) used for the cleaning. This fluid is fed via conduit 56 back to purification installation 50. The cleaned solid substance (for instance the cleaned container material) is discharged via outlet 57, for instance to a receiving unit 58. The received solid substance can then be discharged, for instance for reuse thereof.

Figure 9:
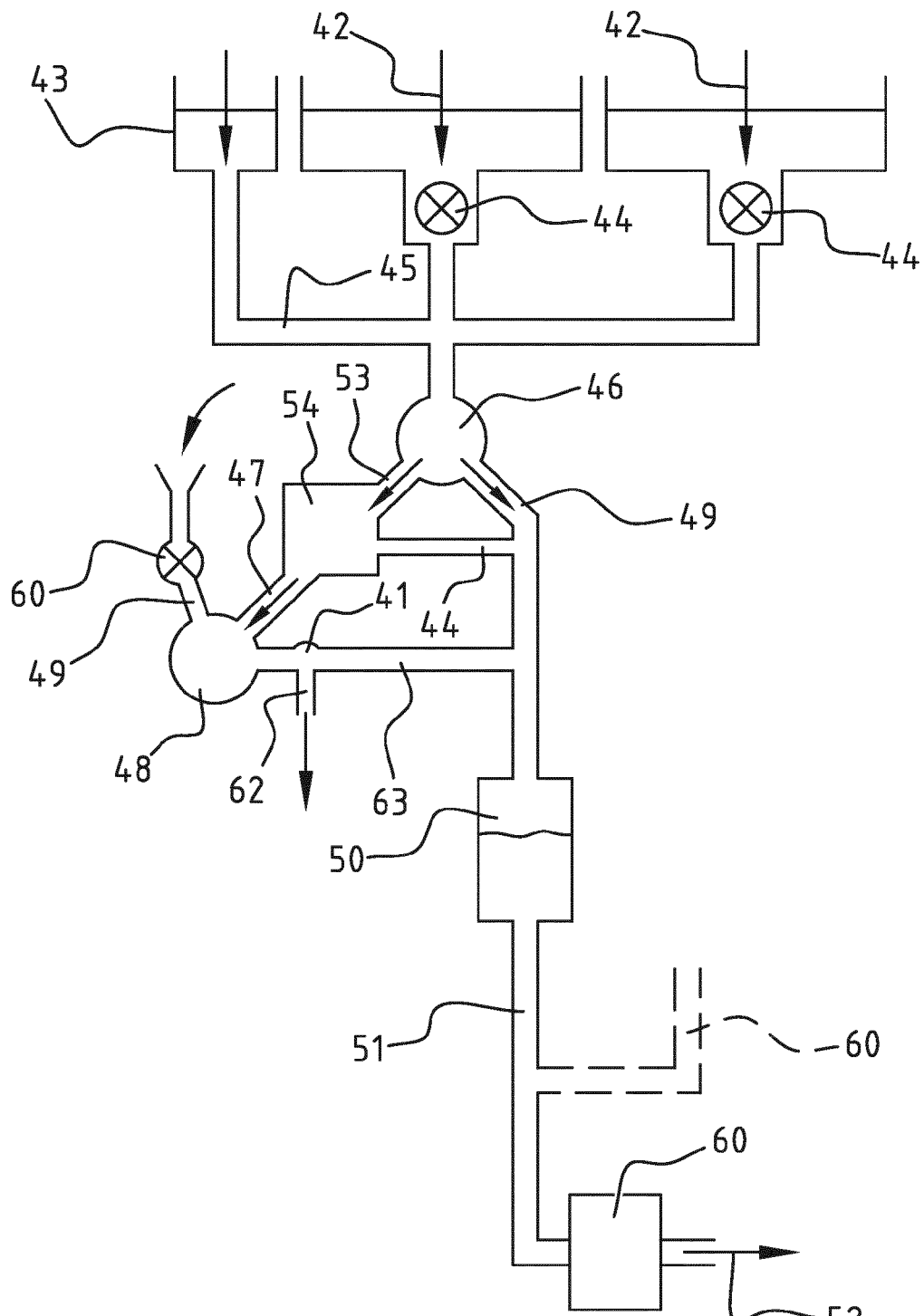
FIG. 9 is a schematic view of a second variant of the waste treatment system for use with waste material with biodegradable containers.

FIG. 9 shows another example of the waste treatment system according to the invention. The waste treatment system as a whole is designated here with 61 and waste is fed via inlet units 42 or 43 and discharged via a conduit system 45. The waste flows of the different inlet units are generated in the same manner as described with reference to FIG. 8. Inlet units 42 correspond to the inlet units 2 shown in FIG. 8. Inlet units 43 are units via which a waste flow can be discharged which does not require shredding, for instance when the waste flow consists of shower water.

In contrast to the above described situation, the waste material in FIG. 9 comprises of, among other materials, a solid substance which is biodegradable. In the waste flows the material of the containers to be shredded can for instance consist of biodegradable types of material, such as paper-like types of material, biodegradable plastics such as PLA plastics and the like. These are shredded in the above described manner in a shredding device 44 and fed centrally to a separating device 46 where separation once again takes place between the actual waste flow (via conduit 49) and the container material (via conduit 53). The actual waste flow is fed to a purification installation 50 and the water becoming available here is discharged via outlet 50 for possible reuse.

The biodegradable solid substance made available in separating device 46 (for instance—though not limited thereto—the shredded container material) is first cleaned in the above described manner in cleaning device 54. Here too the fluid (for instance flushing water) used which may come from outlet 60 is again fed to purification installation 54. Via conduit 64 the liquid part of the waste flow can be discharged in the direction of purification installation 50, while the cleaned container material is fed via conduit 47 to a fermenter 48. A further waste flow, such as kitchen waste, can likewise be fed to this fermenter 48 via inlet 49 and a further shredding device 60.

Figure 1:
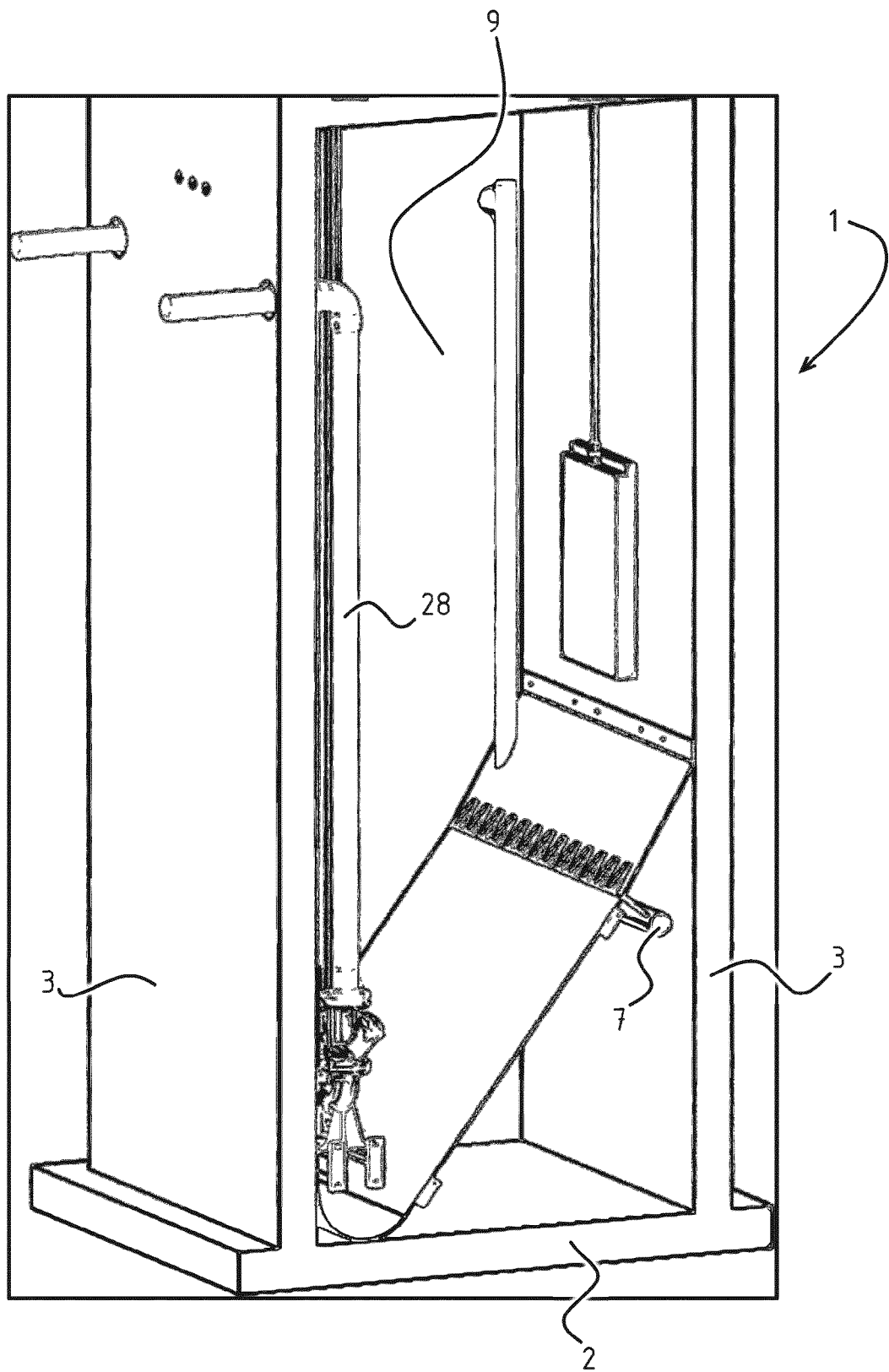
FIG. 1 is a partially cut-away perspective view of an embodiment of a sewage pit according to the invention.
Figure 2:
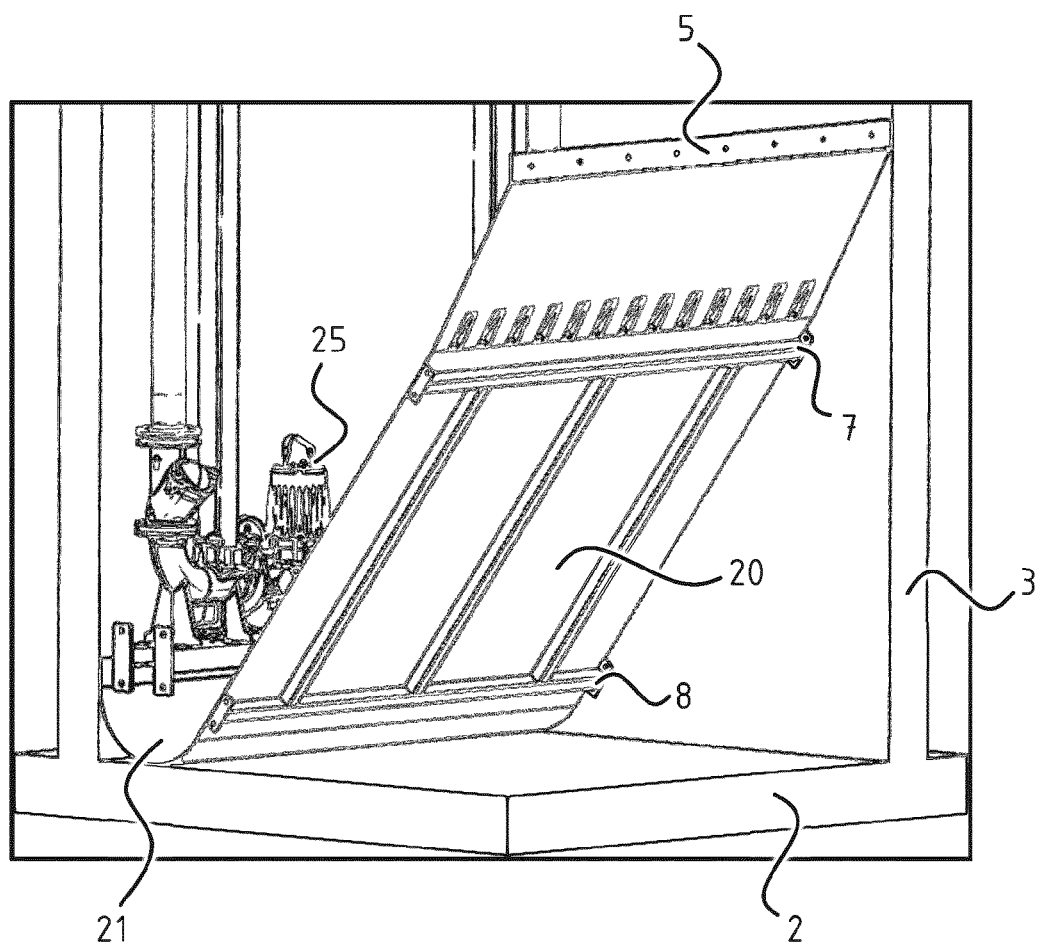
FIG. 2 is a further cut-away perspective view of the lower part of the sewage pit of FIG. 1.
Figure 3:
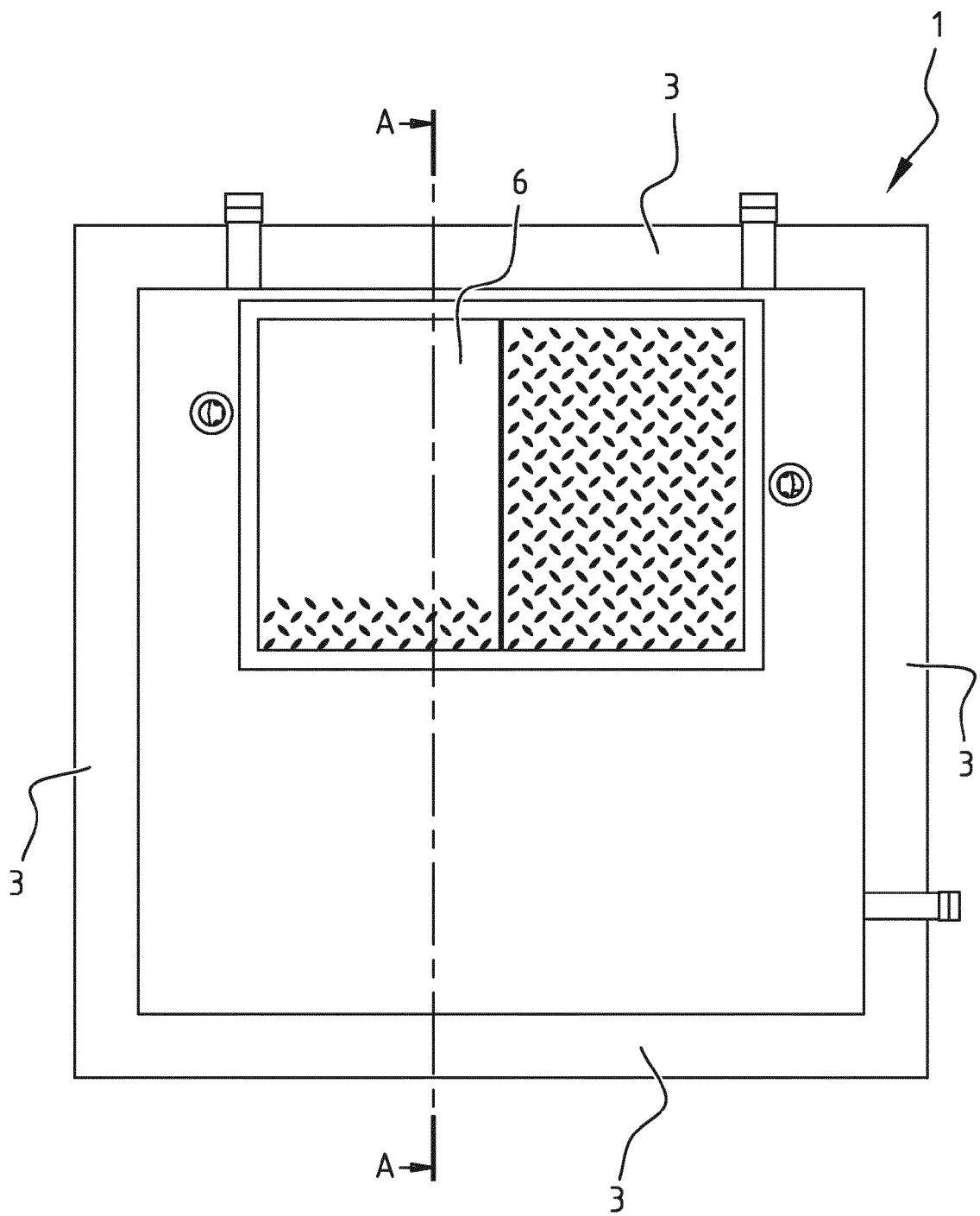
FIG. 3 is a top view of the sewage pit according to an embodiment of the invention.

Heat/gas is released during the fermentation in fermenter 48. This heat/gas can be used to heat fermenter 48 and/or to generate energy in order to enhance the degradation process and the conditions for the micro-organisms in the fermenter. The solid/liquid waste flow is fed to separator 61. Here hard components are filtered out and discharged for composting purposes 62. A heating step optionally also takes place in order to eliminate possible bacteria in the hard components through heating. The softer components including liquid are fed via conduit 63 to purification installation 50. The purified waste material is then transported to one or more sewage pits 60 and then discharged from sewage pits 60 to the public sewer system 52. FIGS. 1 and 2 show an embodiment of such a cesspit or sewage pit 1. In the shown embodiment the sewage pit takes a substantially block-shaped form and comprises a lying wall part 2 or base part, four upright wall parts 3 and a lying wall part 4 which encloses on the upper side the receiving space 9 formed in the pit. FIG. 3 further shows that provided in upper wall 4 of the sewage pit is a recess which can be closed with an access hatch 6, for instance a tear plate floor. Access hatch 6 has a low weight such that it can be lifted in simple manner in order to gain access to the sewage pit. Stairs (not shown) whereby an operative can enter pit 1 via the recess in upper wall part 4 are further arranged in the sewage pit.

Figure 7:
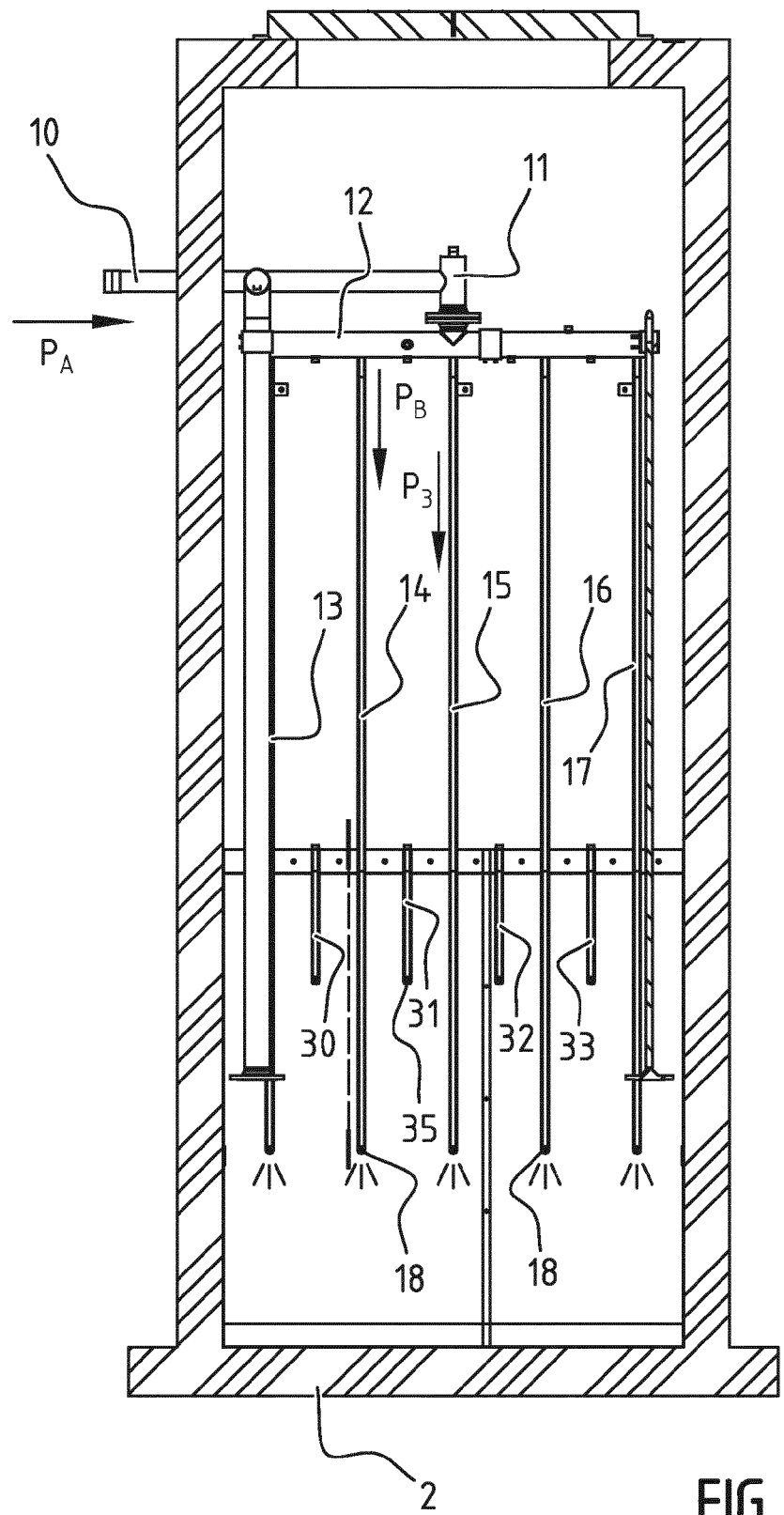
FIG. 7 is a cross-section along D-D of FIG. 4.

FIG. 7 shows that an inlet conduit or flushing conduit 10 is provided in the upper part of the pit. This flushing conduit 10 is arranged in a corresponding opening in side wall 3 of the pit and is connected in usual manner to the domestic mains water supply. Flushing liquid in the form of water is supplied (direction $P_A$) in this mains water supply. The water pressure can vary here, for instance between 1 and 5 bar. Flushing conduit 10 debouches inside receiving space 9 onto a distributor 11 which distributes the supplied water via a manifold 12 over a number of supply conduits 13-17 (five in the shown example, although this number can be greater or smaller in other embodiments). These supply conduits extend along side wall 3 of the sewage pit (for instance FIG. 4) until they reach a position at the height of the upper side of a receiving plate 5. Supply conduits 13-17 continue along the upper surface of receiving plate 5 to a position roughly halfway along the plate. A spray nozzle 18 is arranged on each of the outer ends of supply conduits 13-17. Water supplied via flushing conduit 10 can be guided to spray nozzles 18 under pressure (direction $P_B$) so that the liquid (particularly the water) can be sprayed onto plate 5. The flushing liquid is sprayed in downward inclining direction (direction $P_2$ in FIG. 4), in the direction of the lower side of receiving plate 5.

Figure 4:
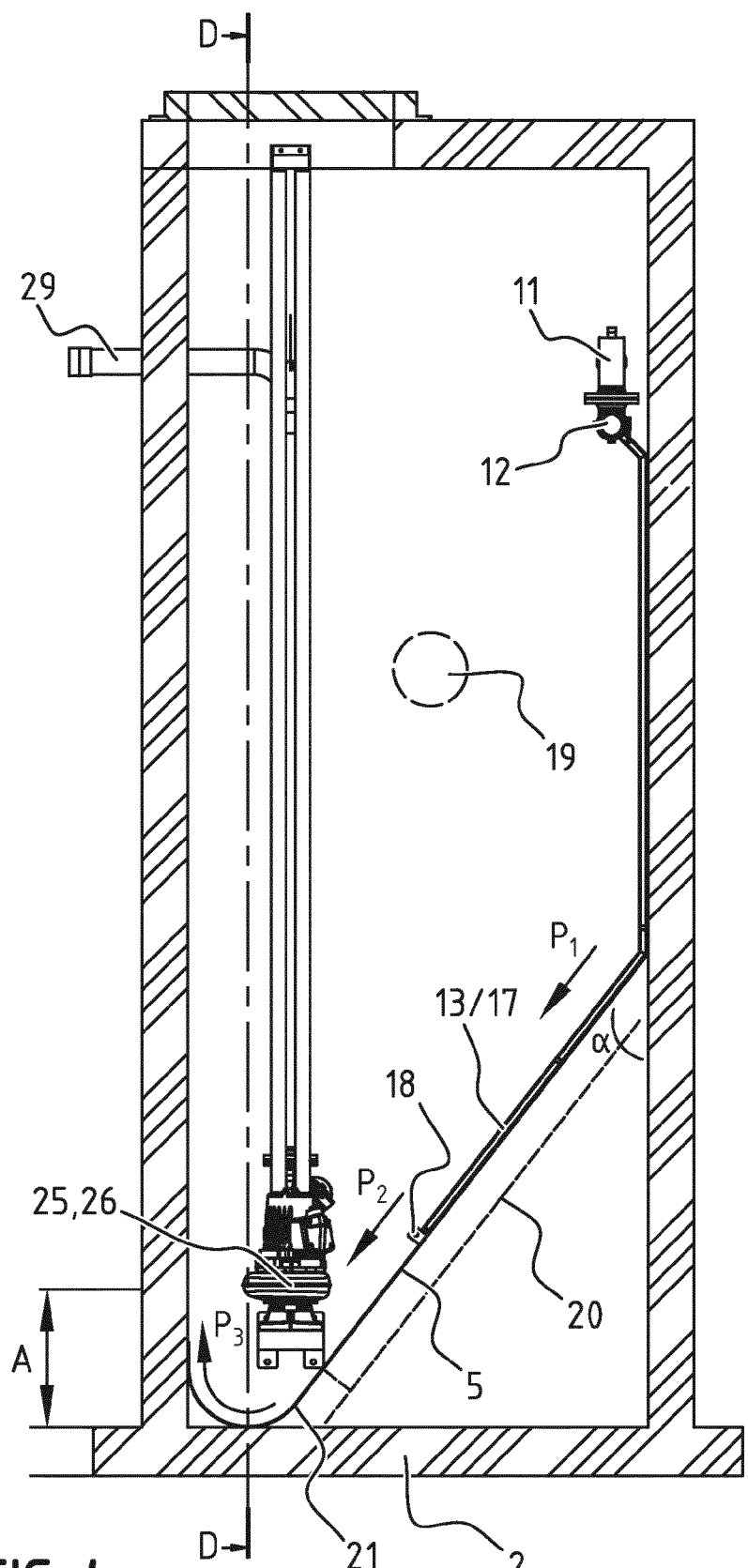
FIG. 4 is a cross-section along axis A-A of FIG. 3 of the sewage pit.
Figure 5:
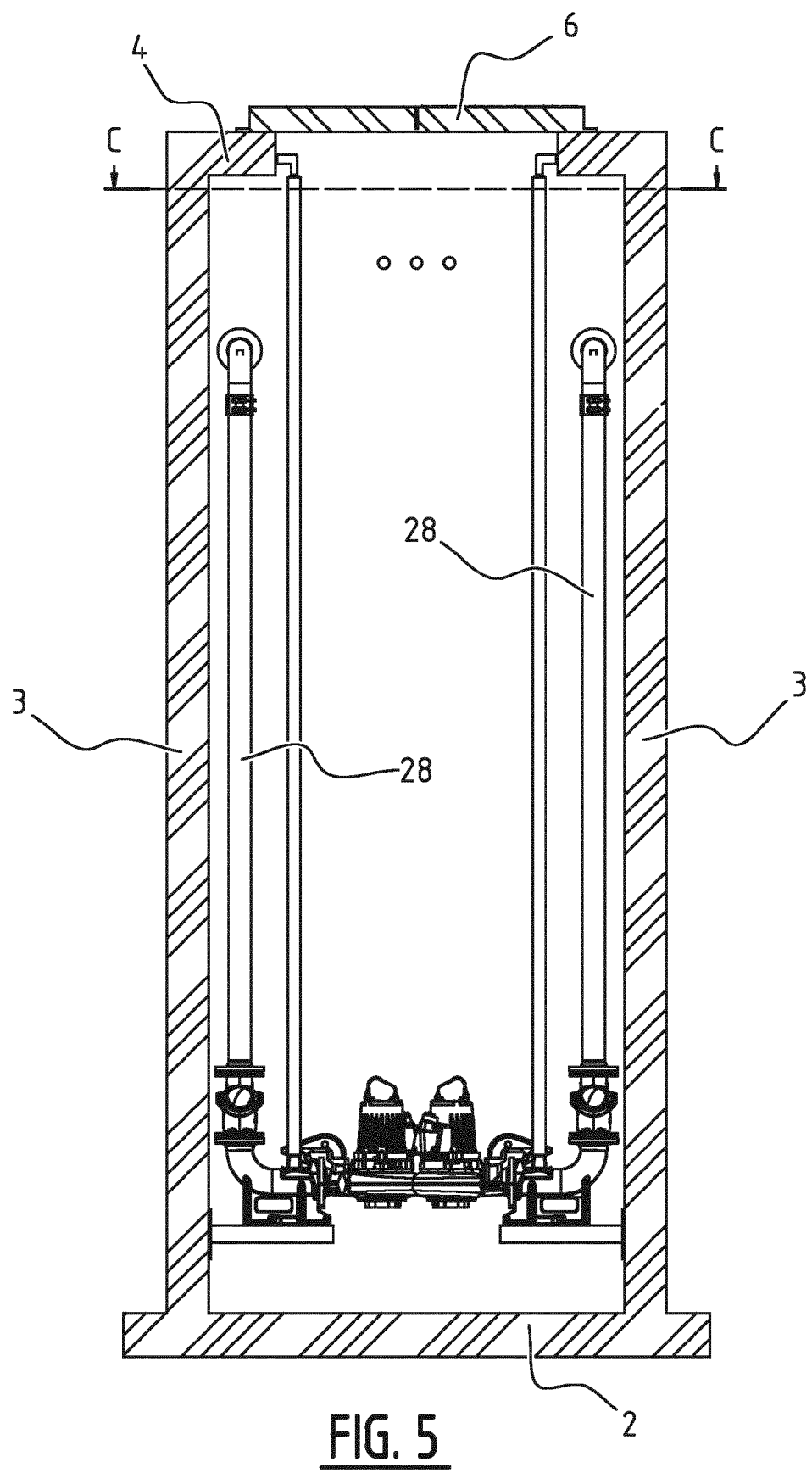
FIG. 5 is a cross-section along B-B of FIG. 3.
Figure 6:
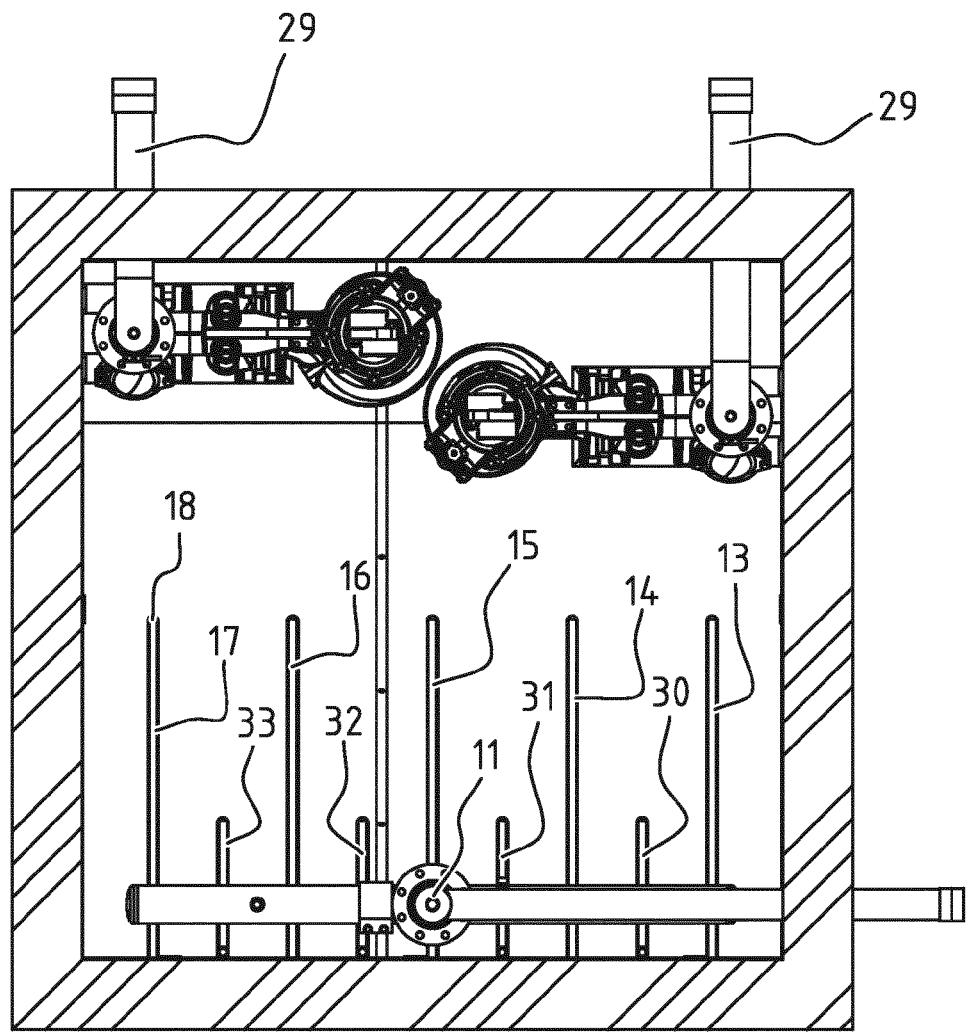
FIG. 6 is a cross-section along C-C of FIG. 5.

In the shown embodiment receiving plate 5 is constructed from two plate parts. First plate part 20 forms a first part-surface which takes a substantially level/even form. The second part comprises a curved portion 21. This curved portion forms a concave part-surface along which the water of supply conduits 13-16 which is sprayed downward is guided (direction $P_3$, FIG. 4). As shown in FIG. 4, the water supplied via the supply conduits flows downward along the surface of receiving plate 5 and is set into swirling motion as a result of the form of the part 21 thereof.

The waste from the building, for instance the shredded and optionally cleaned and/or separated hospital waste, arrives via a feed 19 (FIG. 4) and is pumped into receiving space 9 in large quantities. The shredded waste will move downward (direction $P_1$, FIG. 4) under the influence of the force of gravity and would accumulate close to the lower side of the pit if the spray nozzles did not dispense flushing liquid. Due to the oblique arrangement of receiving plate 5 and the action of the spray nozzles, the waste material, consisting of a mixture of liquid and solid constituents, will however be directed in the direction of concave part 21 during use. Due to the above stated swirling motions resulting from the form of receiving plate 5 and the pressure of the liquid sprayed via sprayers, the solid constituents of the waste material will enter (further) into suspension. On the lower side of the sewage pit this large quantity of suspension will comprise liquid waste material, solid parts of the waste material and flushing liquid. This suspension can be discharged in simple manner, for instance by pumping up this suspension via pumps 25, 26 (FIG. 4) and discharging it via discharge conduits 28 and an outlet 29 to the sewer. Outlet 29 (outlet conduit) is for this purpose connected directly to the sewer system.

It is important that the waste material arranged in the receiving space moves as far as possible to a side of the sewage pit in order to be brought into suspension locally. As stated above, receiving plate 5 is disposed obliquely for this purpose. The angle of inclination (a) (see FIG. 4) between upright wall 3 and receiving plate 5, more particularly the even part 20 of receiving plate 5, preferably lies between 40° and 80°. It has been found that, particularly for the shredded hospital waste, this angle of inclination is sufficient to displace the waste material in downward direction ($P_1$, FIG. 4). Once the waste material has reached a position beyond spray nozzles 18 and is entrained by the flushing water, the waste material will come to lie above the curved part of receiving plate 5 and be set into swirling motion.

As shown in FIG. 7, it is possible to optionally provide the sewage pit with a number of additional supply conduits for flushing liquid. These supply conduits are only partially shown in FIG. 7 (supply conduits 30, 31, 32, 33). Supply conduits can be connected to the upper outer ends of these conduits (not shown), while spray nozzles 35 similar to spray nozzle 18 are provided on each of the undersides of these conduits. With these additional conduits 30-33 it is also possible to spray the flushing liquid onto the upper side of the receiving plate, and at a position further upstream relative to the waste flow. The waste flow can in this way be displaced even better (if necessary, depending on the composition of the waste flow) in downward direction to curved part 21 of receiving plate 5.

In the shown embodiment the distance A (FIG. 4) between the upper side of base 2 and the position of pump 25, 26 is preferably smaller than 2 metres, more preferably smaller than 1 metre. The waste material is in this way removed at the position where there is the greatest chance that the waste material is in suspension. Pumps 25, 26, at least the mouths thereof, can in other embodiments also be situated at a different position inside receiving space 9.

The present invention is not limited to the embodiments thereof mentioned herein. The scope is defined by the following claims, within the scope of which numerous modifications and adjustments can be envisaged.

The invention claimed is:

1. A sewage pit for receiving and discharging waste material comprising liquid and solid constituents, to the sewer, the sewage pit comprising:
    a housing with a closable receiving space, wherein one or more of the walls of the housing is provided with at least one inlet configured to carry the waste material into the receiving space, a flushing liquid feed which is embodied to feed a flushing liquid to the receiving space for bringing the waste material into suspension, and at least one outlet which can be connected to the sewer and is configured to discharge the mixture of waste material and flushing liquid from the receiving space and to the sewer,
    a receiving surface formed on the lower side of the receiving space configured to set the waste material at least partially into a swirling motion with the flushing liquid, wherein the receiving surface is formed by a receiving plate which can be mounted, or is mounted, obliquely in the receiving space,
    wherein the flushing liquid feed is configured to allow the flushing liquid to flow along the upper side of the receiving plate,
    and wherein the flushing liquid feed comprises one or more feed conduits provided with a spray nozzle, wherein the spray nozzles are arranged such that the flushing liquid can be sprayed in a downward inclining direction onto and along the receiving surface in the direction of the lower side of the receiving plate; and
    at least one pump connectable or connected to the one or more outlets which is configured to pump the mixture which has been brought into suspension from the receiving space and to discharge the mixture via the one or more outlets,
    wherein the one or more feed conduits extend along a side wall of the sewage pit until they reach a position at the height of the upper side of the receiving plate and continue along the upper surface of the receiving plate to a position about halfway along the receiving plate.

2. The sewage pit as claimed in claim 1, wherein the receiving surface comprises a first even part-surface disposed obliquely and at a higher position and a second concave part-surface disposed at a lower position.

3. The sewage pit as claimed in claim 2, wherein the flushing liquid feed is configured to guide flushing liquid onto and along the first part-surface in the direction of the second part-surface.

4. The sewage pit as claimed in claim 2, wherein the inlet for the pump is positioned a distance of less than 2 m above the concave part-surface of the receiving surface.

5. The sewage pit as claimed in claim 4, wherein the inlet for the pump is positioned a distance of less than 1 m above the concave part-surface of the receiving surface.

6. The sewage pit as claimed in claim 1, wherein the mixture which has been brought into suspension is pumped away from a position close to the receiving surface.

7. The sewage pit as claimed in claim 1, wherein the angle of inclination (a) between the receiving surface and an upright wall amounts to between 30 and 80 degrees.

8. The sewage pit as claimed in claim 7, wherein the angle of inclination (a) is between 40 and 60 degrees.

9. The sewage pit as claimed in claim 1, wherein the flushing liquid feed is connectable or connected to the domestic mains water supply.

10. The sewage pit as claimed in claim 1, wherein the waste material is selected from one or more of domestic, medical and industrial waste.

11. The sewage pit as claimed in claim 1, wherein the receiving plate is a steel receiving plate.

12. The sewage pit as claimed in claim 1, wherein the flushing liquid feed comprises a distributor configured to distribute the liquid via a manifold over the one or more feed conduits.

\* \* \* \* \*